April 19, 1960
R. H. PREWITT ET AL
2,932,967
SCRATCH STRAIN RECORDERS
Filed May 27, 1955
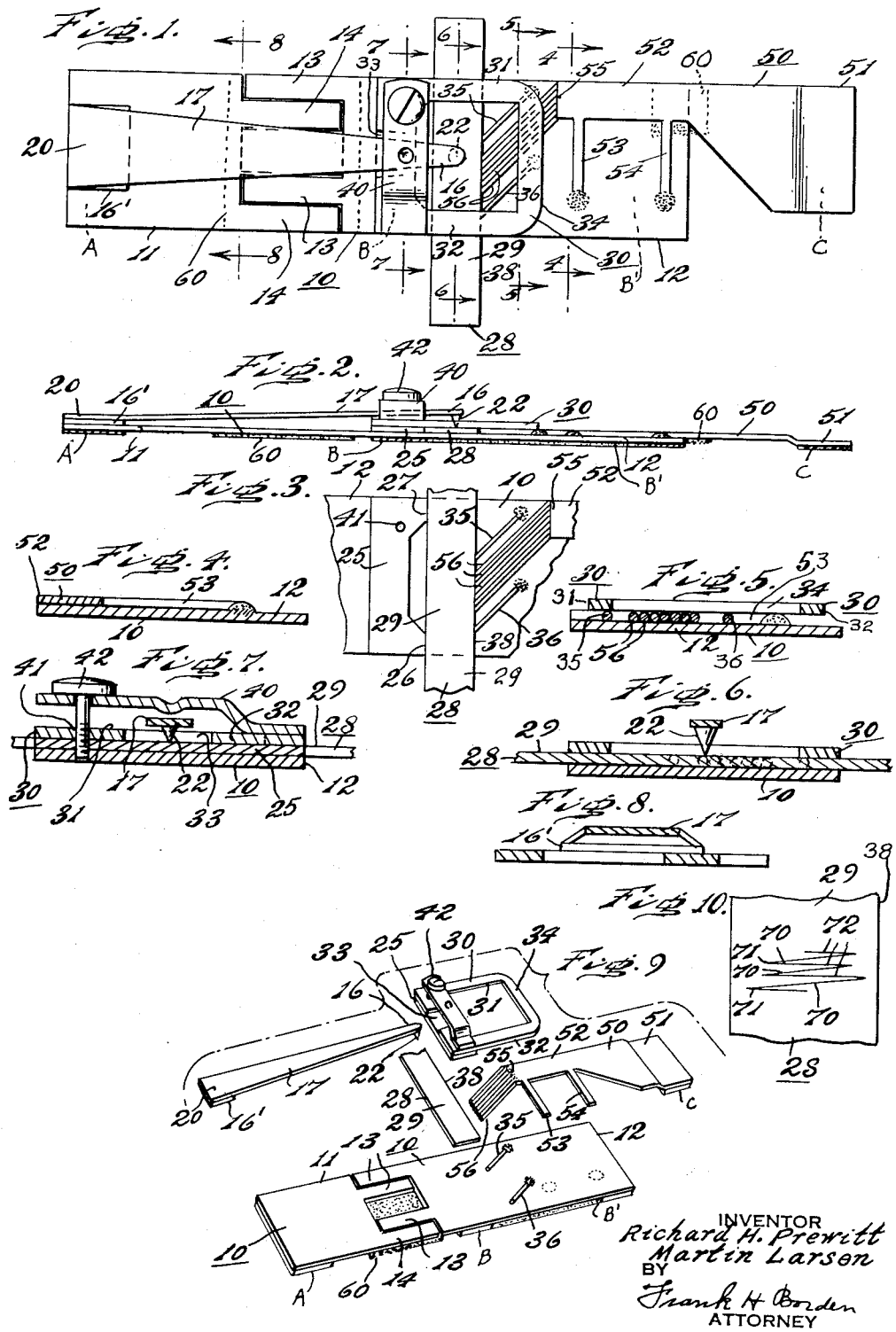
INVENTOR
Richard H. Prewitt
Martin Larsen
BY
Frank H. Borden
ATTORNEY United States Patent Office 2,932,967
Patented Apr. 19, 1960

2,932,967

SCRATCH STRAIN RECORDERS

Richard H. Prewitt, Wallingford, and Martin Larson, Upper Darby, Pa.

Application May 27, 1955, Serial No. 511,622

9 Claims. (Cl. 73—88)

This invention relates to scratch strain recorders, pertaining particularly to instruments anchored to parts susceptible to strains incident to loads to permanently record same.

In its broadest essence the invention is a scratch gage having an arm mounting a sharp crystal or like scratch element overlying a flat smooth target to scratch a record thereon as the part to which the instrument is anchored relatively elongates or contracts under applied loads and thus relatively moves the crystal and target. It is necessary with devices of this type to effect relative lateral motion of the target and crystal in order to effect separation of successive recorded scratches so that the sequence of strains and their respective amplitudes can be read under a microscope.

As previously provided such relative lateral motion has been effected either by subjecting the target or the scratch arm to the constant application of a spring bias, by which, during any transverse relative crystal motion across the target the biased element progresses under the bias. This causes each scratch in both directions to be a resultant of two relatively normal forces. Such systems effect irregularities in the scribed record, due to the non-linear unloading rate of the bias as the biased element progresses and due to the variable friction opposing the bias. That is, at the start of the bias force the motion of the biased part per increment of transverse scratch is a maximum, and this motion progressively decreases per increment of transverse scratch at a non-linear rate as the part advances. By reason of the fact that scratches in both directions are angularly divergent from the normal to the line of relative advance of the target or scratch arm under the bias the total number of scratches for a given target area is sharply reduced, thus cutting down on the number of successive load changes that can be recorded. Finally the spring device and long targets when used increased the thicknesses and widths of the instruments.

It is among the objects of this invention: to improve the art of scratch strain recorders; to provide a scratch strain recorder with a movable target with means for advancing the target as a function of the amplitude of a given strain; to provide a scratch strain recorder to record strains in one sense while the target is stationary and to record strains in the opposite sense while the target is progressed as a function of the amplitude of the latter strain; to provide a scratch strain recorder with a movable target in which the target is held stationary in one relative motion of the scratch element and target and in the opposite relative motion is subjected to a target shifting force; in an instrument having a bodily shiftable target to translate relative motions transverse of the movable target into target motion transverse of the relative motion; to provide a scratch strain recorder of extreme simplicity and low cost which is more compact than has previously been attainable; to provide a scratch strain recorder with a base plate of two functionally independent interfitting or interconnected parts held rigidly together by a soluble coating or plastic matrix for facility in mounting on a part susceptible to varying loads and which coating is subsequently dissolved to reestablish functional independence of said parts; to provide a scratch strain recorder which without change can receive and utilize targets of different widths selected according to the amplitude of strains to be recorded; to provide a scratch strain recorder whose length of attachment to a stressed member may be varied for the recording element and/or the transverse indexing member; and to provide means of establishing the proper pressure between the scratch member and the target. These and other objects and advantages will become more apparent as the description proceeds.

In the accompanying drawings forming part of this description:

Fig. 1 represents a plan view of the instrument in an illustrative form, as mounted on work (not shown), susceptible to elongation and contraction in response to loads in tension and compression respectively.

Fig. 2 represents a side elevation thereof prior to mounting on work.

Fig. 3 represents a fragmentary plan with portions removed to show the relation of the target to the holding springs and to the advancing brushes in one instantaneous setting thereof.

Fig. 4 represents a section through the instrument taken on line 4—4 of Fig. 1.

Fig. 5 represents a section through the instrument taken on line 5—5 of Fig. 1, just inside of cross connection 34, to be described.

Fig. 6 represents a section through the instrument taken on line 6—6 of Fig. 1.

Fig. 7 represents a section through the instrument taken on line 7—7 of Fig. 1.

Fig. 8 represents a section through the instrument taken on line 8—8 of Fig. 1.

Fig. 9 represents an exploded perspective of the instrument as shown in Fig. 2.

Fig. 10 represents a diagrammatic fragmentary plan of the target with a fragmentary scratch record thereon as illustratively produced by the preferred form of the instrument.

The instrument according to an illustrative but presently preferred embodiment thereof, comprises a base plate 10, of suitably rigid and strong material, such as a thin sheet of metal. Copper is satisfactory but where temperature effects are important the base plate and recording arm will be made from material of the same heat expansion characteristics as that of the work for which strains are being recorded. The base plate 10 is comprised of a rear or arm portion 11, and a forward or target-mounting portion 12, with the portions, after mounting on the work, susceptible to longitudinal motion relative to each other, in any desired sort of organization. In the presently preferred operative assembly the contiguous ends of completely separate portions 11 and 12 are provided with transversely staggered longitudinal mating fingers 13 and 14. These fingers are initially rigidly bonded together by a layer of soluble material 60, for manipulating and anchoring the base plate 10 as a rigid whole on the work, at the spaced areas to be described. After mounting the instrument is sprayed with a suitable solvent to dissolve the coating or layer 60 and to remove it from the work and from the base plate. As the desire is to effect a base plate with relatively movable opposite terminal portions 11 and 12, it will be seen that any desired structure may be utilized for this end. For instance the base plate 10 may be an integral sheet stamped or otherwise cut out to form staggered fingers between the portions 11 and 12. Here again the plate is formed as a rigid manipulatable element by the soluble coating layer 60, bridging the spaces between the fingers. It will be understood that in operation in the average case the relative motion between portions 11 and 12 is microscopic.

It will be understood that in assembling the instrument, and in attaching the instrument to the work at the areas to be described, any anchoring or securing means that seems desirable can be used. In general it is preferred that all bonding be done with solder, cement or glue or the like.

The instrument organized on and relative to the base plate 10 comprises means for holding and guiding a target 28 for sliding axially transversely across the base plate-portion 12, a scratch arm 17 mounted on the base plate portion 11, in position to scratch the target 28 functionally with relative longitudinal motion of base plate portions 11 and 12, and separate indexing means anchored to the work, spaced from the portion 12, and operative to progress the target 28 laterally (axially of the target) as a function of the amplitude of a strain in one sense only, manifested between the anchorage of the separate means and portion 12. In this regard it is important to note that the manifestation of the strain, causing relative scratching between the scratch arm and the target, is independent of and is not loaded or modified in any way by the manifestation of the same strain causing longitudinal advance of the target transversely of the scratch arm.

The arm end portion 11 of base plate 10 mounts a metal or like shim 16 on its upper surface, to build up the thickness at the extreme rear or arm end of the base plate. A scratch arm 17, of elongated triangular shape, and formed of metal such as copper, for illustrative instance, is provided, the wider base end 20 of which is rigidly mounted on and affixed to the shim 16'. The forward free end 16 of the arm 17 mounts a rigid, downwardly extending rigid crystal or like scratch element 22. It will be observed that the arm 17 is almost parallel to the base plate 10 and is therefore almost parallel to the work on which the instrument is ultimately mounted. This general substantial parallelism enhances the stiffness of arm 17 by the substantial elimination of bends therein.

The target-mounting base portion 12, while forming one surface of the target-receiving channel organization, forms a support for the other target channel-defining portions to be described. A target-backing plate 25 having bearing surfaces 26 and 27, in alignment transversely of the longitudinal extent of the base plate 10, is anchored to the latter, with the bearing surfaces presenting or facing away from the base plate portion 11. The target-backing plate 25 is at least of the same thickness as, and preferably is slightly thicker than the target 28.

The target 28 is comprised of a generally oblong-shaped sheet, preferably of thin sheet metal, having a smooth upper surface 29, adapted to be scratched by the scratch element 22, to establish a permanent record which is not affected in ultimate readability by exposure to ordinary fire or the like, such as may arise, for instance, with certain types of crashes of aircraft on which the instrument is mounted. It is usually preferred that the target 28 be formed of silver plated copper.

It will be understood that the target 28 is slidable axially, longitudinally of its length, transversely of and upon the base plate forward part 12, guided on one edge by the aligned bearing surfaces 26 and 27 of the backing plate 25. While it is preferred that the axial line of motion of the target be normal to the longitudinal axis of the scratch arm 17, generally aligned with the longitudinal center line of the base plate 10, it may be inclined from such normal relation.

A generally U-shaped holding member 30 is provided, having parallel side legs 31 and 32, forming a gap or space 33 at their inner free ends, and being connected at their outer ends by a transverse integral connection 34. The holding member 30 is fastened to the top of the backing plate 25, so that the narrow terminal end 16 of the scratch arm 17 passes across the transverse space 33, with the scratch crystal 22 disposed in the area defined by the legs 31 and 32 and the cross connection 34. In assembly the legs 31 and 32 are parallel to the base plate portion and overlie and guide the target 28 on its upper surface 29. The target 28, by the base plate portion 12, the backing surfaces 26 and 27, and the legs 31 and 32, is thus positively guided on three of its surfaces. This leaves one target edge 38, still to be restrained and guided.

To guide the target on its forward edge 38, spring fingers 35 and 36 are provided, anchored at their forward ends to the base plate portion 12, and inclined to the longitudinal axis of the base plate portion, and with their free ends extending into the space to be occupied by the target 28 so as to be deflected thereby to, by target edge 38, when the target is inserted laterally from one side of the base plate portion 12. The fingers 35 and 36 may comprise resilient wires which lie in the general plane of the target 28 and bear against the forward edge 38 to complete the guidance thereof. The fingers may be designated as holding springs or fingers. Each preferably has a carefully sharpened free end registry face for impingement against the juxtaposed edge 38 of the target 28, so disposed and arranged as to frictionally hold the target from moving in one direction, while permitting sliding movement of the target in the other direction in response to force in said other direction.

According to the purposes and functions of the given instrument it is contemplated that targets of different respective widths may be inserted and used in the instrument organization. The selected widths are determined by the requirements either for the recording of large tensile stresses, requiring wide targets, or large compressive stresses, requiring narrow targets, or alternately the recordation of small fatigue stresses near the same datum stresses near the work part existing at the time of the installation of the instrument where medium width targets will be used. This simply means with wider targets the springs 35 and 36 as well as the brush member 56 of the indexing means are deflected upward to a greater degree when the strains in the work are zero.

To enhance the scratching relation of the crystal or like scratch-element 22 to the upper surface 29 of the target 28 inherent in the assembly and to the rigidity of the arm 17, a bent bracket 40 is fastened to one side of the holding member 30. Bracket 40 extends transversely across the reduced tapered portion 16 of the arm 17, adjacent to the scratch element 22, to bear downwardly against the arm to force the crystal 22 against the target 28. This enhanced frictional bite between the crystal 22 and the target surface 29 may be controlled by the adjustable screw 42 passing through the bracket 40 into a threaded aperture 41 in the backing plate 25.

It is necessary to provide indexing means to traverse the target in response to the imposition or removal of a load on the work to which the instrument is anchored. To this end a plate 50 is provided having at one end a terminal bent portion 51 for anchorage to the work subjected to the stresses, and at the rearwardly extending free end being reduced to a relatively narrow neck portion 52, from which integral spring fingers 53 and 54 project generally normal to the neck portion 52. The free ends of the fingers are anchored to the upper surface of the base plate portion 12. It will be seen that the plate 50, except for its bent end portion 51, the neck portion 52 and the fingers 53 and 54 all lie in a plane parallel to the base portion 12 in intersection with the target 28. The rearward end of the neck portion 52, at 55 mounts the inner ends of a plurality of mutually parallel angularly inclined brush members 56, also lying in the general plane of the target 28. The inclination of the brush members 56 is relative both to the edge 38 of the target and to the longitudinal axis of the base plate 10, and also to the normal to the target edge 38. The free ends of the brush members initially extend into the space to be occupied by the target when inserted and are flexed to increase their angles of inclination to the normal of the target edge 38 when the target is inserted and slid axially across the base plate portion 12. It will be understood that the brush members 46 may be integral finger portions formed on the end of the neck portion 52 of the plate 50, although for enhanced resilience it is preferred that they be initially separate spring fingers, secured to the end 55 of the neck portion 52 of plate 50.

The connecting member 34 of the holding member 30, extends over and guidingly holds the brush members 56, as well as the spring fingers 35 and 36, against motions vertical of the plane of the base plate portion 12, so that they all continue to engage the edge surface 38 of the target. It will be understood that the brush members 56 each have carefully faced free ends to provide a driving edge on the advancing side of the brush. These faces of the tip ends of the brush members are generally mutually out of parallel alignment except when under appreciable deflection.

According to the purposes and functions of the given instrument it is contemplated that targets of different respective widths may be inserted and used in the instrument organization. The selected widths are determined by the requirements either for the recording of large tensile stresses, requiring wide targets, or large compressive stresses, requiring narrow targets, or alternately the recordation of small fatigue stresses, near the same datum stresess on the work part at the time of the installation of the instrument where medium width targets will be used. This simply means with wider targets the springs 35 and 36 as well as the brush members 56 are deflected upward to a greater degree when the strains in the work are zero.

It will be seen that with the base portion 12 anchored to the work at area B, under the general area of attachment of the backing plate to base plate portion 12, and with the plate 50, at its deflected portion 51 anchored to the work at point C, in spaced relation to the anchorage of the base plate portion 12, stress on the work imparting strain, if in tension, will move plate 50 away from the target 28, while, if in compression, will move the plate 50 toward the target 28. It will also be seen that at the same time flexing of the work in compression will move the anchored end A, of the crystal-mounting arm 17 relative to the target mounting anchorage B, of plate portion 12 to impose a scratch from the crystal on the target in one direction, and if in tension will impart a scratch on the target in the other direction.

Let it be assumed that the strain is in compression and plate 50 and base plate portion 12 move relatively toward each other. The primary result is that the neck portion 52, carrying the brush members 56 moves in general parallelism with the longitudinal axis of the base plate portion 12, in almost a linear motion. As the brush members 56 are in impingement at their free ends against the target edge 38, and the target cannot move normal to the edge 38 because of its engagement against the bearing surfaces 26 and 27, and as the rear end 55, mounting the anchored ends of the brush members 56 moves toward the target, the brush members are flexed so that the free ends thereof are forced to move away from the holding spring 35 and toward holding spring 36. As the frictional bite of the brush fingers against the target edge 38 prevents slippage of the free ends on and relative to the target edge 38, the entire target 28 is caused to move longitudinally axially, a microscopic degree behind the holding springs 35 and 36. The latter merely flex to permit this motion as their frictional bite is only effective in the other direction of target motion. It will be seen that the degree of axial motion imparted to the target in response to the movement of the end 55 of the neck 52 toward the target is a direct function of the degree of motion of the end 55 toward the target.

At some point the imposition of increasing load on the work comes to a stop and the motion of the target under flexure and translated thrust of the brush members stops. It will be evident that as a function of the imposed load the end 16 of the scratch arm, mounting the crystal 22 will have effected relative transverse movement of the crystal on the scratch-receiving surface 29 of the target. As this scratch record is being made there has been an axial progression of the target under the crystal 22, so that the scratch in direction is a resultant of both of these movements. This is indicated completely diagrammatically by lines 70 in the fragmentary record of Fig. 10.

Assume that, as noted, the load change stops. This causes stoppage of the relative scratch motion of the crystal and also of motion of the target. Such termination is indicated diagrammatically at terminal ends 71 of the scratch lines 70. In due course there is a load change in the opposite sense. If the initially described load imposition has been in compression, in due course there is the imposition of a changing load in tension.

The beginning of the reversal of load imposition finds the scratch element or crystal 22 at a point 71 on the target. As the tension load becomes manifest there is the start of relative crystal motion transverse of the target. As a function of the same load the end 55 of the neck 52 of the indexing means starts to move relatively away from the target. The free ends of the brush elements ride lightly and without appreciable friction against the edge 38 of the target, moving by their resilience away from the holding finger 36 and toward holding finger 35, to resume generally the attitudes shown in Figs. 1 and 3. Of course the actual attitudes assumed depends upon the amplitude of the relative withdrawing motion. However the withdrawing of the end 55 from the target 28 finds the free ends of the holding fingers 35 and 36 biting into the edge 38 of the target to hold it firmly against any axial motion during such withdrawal. As the target moves axially only during the illustrative compression loading of the part, it is held against such motion during the imposition of tension loads, and the scratch line formed on the target surface 29 is completely linear transverse of the target as indicated by the several parallel lines 72 normal to the edge 38 of the target.

The total record on the given area of target is therefore of substantially twice the number of successive opposite record scratches available from an instrument in which the target is subjected to a bias operative to move the target axially with both directions of relative scratch element and target motions, in which both directions of scratches are as resultants of two generally normal forces.

The instrument is to record loads on a given part, over a short or a long period of time, to facilitate sensible decisions as to retiring a part before an actual failure thereof, or, in view of the relative immunity of the record data on the target to obliteration by heat and other deteriorating effects, to furnish a record of the loads on the part prior to and through failure, even where the instrument and part have been subjected to fire, as for instance, as noted in certain type of aircraft destruction.

In mounting the instrument, say for instance on a propellor or a wing or rotor blade of aircraft, for purely illustrative instance, it is held in its rigid base plate organization by the soluble cement coating or plastic matrix 60, both over mating fingers 13 and 14, and over the jointure between plate 50 and base portion 12, and is juxtaposed to the part, designated the work. It is then secured by any desired anchoring means in general alignment longitudinally of the instrument, with at least three longitudinally spaced areas of anchorage. These areas have been previously identified as, A, at the extreme rear end of the base plate portion 11, under the anchor point of the arm 17, area B, under the base plate portion 12 beneath backing plate 25 and, area C, under the bent end 51 of the plate 50.

With the parts firmly mounted, water or the necessary solvent is applied to the soluble coatings 60 to remove same. It will thus be seen that the anchored end of the scratch arm 17 can have motion with base portion 11 relative to the base plate portion 12 on which is mounted the target. Related it will be observed there can be relative motion between the base plate portion 12 and the target mounted thereon and the plate portion 50 mounting the brush elements. It will be seen that there is no loading of the scratch arm 17 relative to the target for the force for moving the target, and relatedly there is no loading of the target mounting portion and the plate 50 except for the minute force for scratching the record.

While this assembly as described with the three areas of anchorage A, B and C, is adequate for most situations, it will be seen that for large distortions of the work under load, the relative motions of the target and brush-mounting plate may be such as to involve a target transverse motion of excessive amplitude. For this case it is preferred to anchor the forward base plate portion 12 of the instrument at a second area, $B^1$. Preferably $B^1$ is located directly under the spring finger 54, or between 53 and 54.

With the anchorage suggested the strains will be recorded for the length of the work between A and B (when B is attached), and the target will be indexed by the strains which occur between B, or $B^1$, and C. It is proposed to vary the length of the attachment between B and C to provide a variable drive for the system. This is accomplished by providing the additional attaching point $B^1$, which lies closer to C, and thereby reduces the target indexing motion.

The height of the recorded strain record is increased when the distance between A and B is increased and in general recorded accuracy is increased with greater record height; therefore a preferred arangement is to eliminate the attachment at B and establish attachment $B^1$ to provide desired separation between the scratch marks 70 and 72.

It is contemplated that various numbers of the instruments will be scattered about the structure, such as the aircraft, on strategic areas thereof, and if desired each may be covered with a transparent plastic housing secured to the work and enclosing the given instrument, to keep it clean and prevent undue interference with free airflow thereover.

It is believed the simplicity, low cost and high efficiency of the invention will be evident.

We claim as our invention:

1. In instruments of the class described, a scratch element and a target in mutually operative relation, said target and scratch element having relative motions in response to strains in both compression and tension senses, said scratch element being fixed against lateral motion, means holding said target against lateral motion during strains of one sense only whereby the relative motion of the scratch element and target effects a scratch record on the target which is linear and in the line of relative motion of the scratch element and target, and means responsive to strains of the other sense only for moving said target laterally relative to the scratch element whereby the relative motion of the scratch element and target is a compound motion effecting a scratch record as a resultant of such compound motion.

2. In instruments of the class described, a scratch element, a target in operative relation to the scratch element, means responsive to imposed successive strains in both compression and tension senses for effecting relative movement of the scratch element and target, means responsive to strains of one of said senses only for relatively moving the target transversely of the scratch element as a function of the amplitude of such strain, and means for holding the target against movement transversely of the scratch element during imposition of strains of the other sense only.

3. In an instrument of the class described, cooperative scratch means and target means for scratching a record of a series of successive strains comprising strains of respectively opposite senses on an associated part, and separate means for repeatedly advancing the target relative to the scratch means in one direction only as functions of strains in one sense only of said series of successive strains of respectively opposite senses.

4. In an instrument of the class described, a scratch element and a target disposed for recording strains in both compression and tension senses by scratches on the target, and means responsive to strain in one of said senses only for axially shifting the target relative to the scratch element, and means for holding the target against shifting during strains in the opposite of said senses.

5. In an instrument of the class described, a rear base plate portion for anchorage to work susceptible to strains, a front base plate portion for anchorage to the same work in spaced relation to the first mentioned anchorage, a target mounted to move transverse to said plate on the front portion, a scratch arm mounted on the rear base plate portion overlying said target, a scratch element on said arm for engaging said target, a plate for anchorage to the same work in spaced relation to said front base plate portion, spring means on said front portion bearing at an angle against the said target to prevent its axial motion in one direction, and resilient members carried by said plate bearing laterally against said target to impart force to said target to shift same axially in its other direction as the plate and said front portion relatively move with strains on such work.

6. In an instrument of the class described, a base plate, a backing plate mounted on the base plate having guiding surfaces facing one end of the base plate, a scratch arm mounted on the other end of said base plate and extending across the backing plate, a holding spring mounted on the base plate extending toward but spaced from said backing plate to define therewith a channel for a target, said holding spring inclined relative to the longitudinal axis of the base plate, an indexing plate, means mounting the indexing plate on the base plate for relative movement longitudinal of said base plate, resilient brush means on the indexing plate extending toward but inclined relative to said backing plate for bearing against an inserted target, whereby when anchored on a work part susceptible to strain relative motion between the scratch arm and said backing plate effects transverse motion of the end of the scratch arm and the channel for such target, and relative motion of the indexing plate and the base plate causes the resilient brush means to compress against such target to axially shift same.

7. In an instrument of the class described, a support having a general longitudinal axis, indexing means mounted for movement relative to said support generally parallel to said axis, said support and indexing means disposed for anchorage in a plurality of spaced areas to a work part susceptible to elongation and contraction in response to changes of load on such part, means on the support including a one-way target detent means defining a channel transverse of said axis for the reception and guidance of an inserted target, a scratch arm mounted on the support having a free end juxtaposed to said channel, scratch means on said free end in position to engage and scratch a target when in said channel, whereby relative motion of such work part between spaced anchoring areas of said support effects relative motion between said scratch element and said channel, said indexing means including resilient means inclined relative to said axis and extending into said channel whereby with a target in said channel the resilient means engages a target surface and with motion between spaced anchoring areas of the support and indexing means in one sense the resilient means imparts a force component on the target in the line of said channel.

8. In an instrument of the class described, an elongated support having relatively movable end portions, a target backing plate mounted on the front portion, a holding member mounted on the backing plate, a plurality of resilient fingers mounted on said front portion inclined relative to said axis and defining with said front portion said backing plate and said holding member a channel transverse of said front portion for the reception and guidance of a target, said fingers being angularly directed against said target to permit its axial motion in one direction but to act as detents precluding its motion in the other direction, a scratch arm mounted on the rear portion and extending forwardly across the front portion and having a free end mounting a scratch element in juxtaposition to said channel, indexing means comprising an area for ultimate attachment to such work part in spaced juxtaposition to said front portion, said indexing means formed with a plurality of resilient extensions the free ends of which are anchored to said front portion, said indexing means having a rearwardly extending plurality of generally parallel brush members inclined relative to said longitudinal axis disposed between said fingers and normally extending into said channel.

9. An instrument as in claim 3, in which the said separate means advances the target in each of its repeated advances a distance functional with the amplitude of the instant strain of one sense only.

References Cited in the file of this patent

UNITED STATES PATENTS

| | | |
|---|---|---|
| 241,711 | Wurtz | May 17, 1881 |
| 702,328 | Parker | June 10, 1902 |
| 1,665,051 | Briggs | Apr. 3, 1928 |
| 1,982,932 | Scribner | Dec. 4, 1934 |
| 2,081,579 | De Forrest | May 25, 1937 |
| 2,330,959 | De Forrest | Oct. 5, 1943 |
| 2,413,731 | Samuel | Jan. 7, 1947 |
| 2,415,412 | Buchwald | Feb. 11, 1947 |